UNITED STATES PATENT OFFICE.

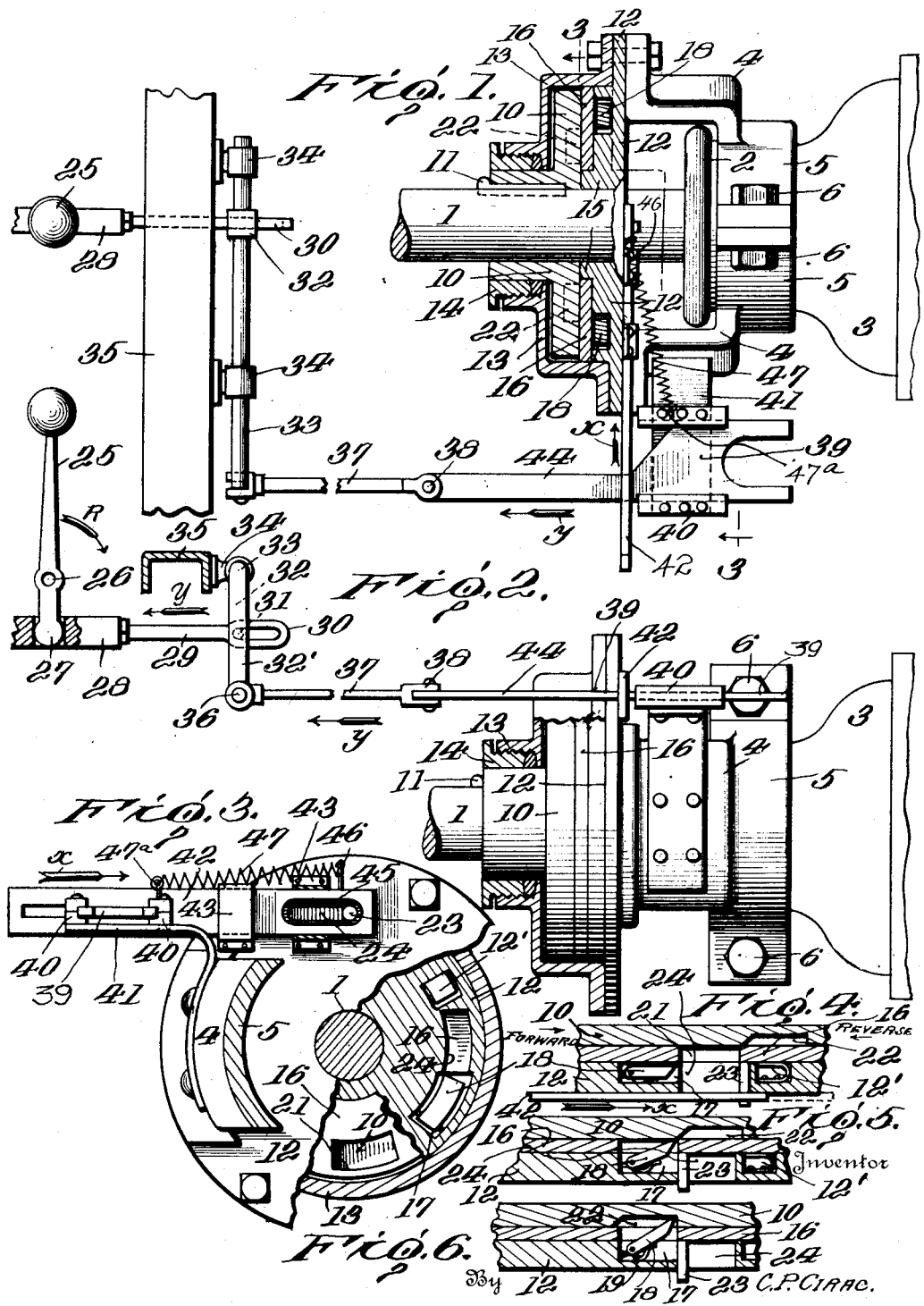

CHARLES P. CIRAC, OF SAN FRANCISCO, CALIFORNIA.

REVERSE-STOP FOR VEHICLES.

1,388,404.  Specification of Letters Patent.  Patented Aug. 23, 1921.

Application filed March 26, 1918. Serial No. 224,738.

*To all whom it may concern:*

Be it known that I, CHARLES P. CIRAC, a citizen of the United States, and a resident of the city and county of San Francisco, State of California, have made a new and useful invention—to wit, a Reverse-Stop for Vehicles; and I do hereby declare the following to be a full, clear, concise, and exact description of the same.

The invention relates particularly to means for preventing the accidental backing movement of vehicles, particularly automobiles.

Among the objects of the invention are to arrest any backward movement of automobiles on inclines, independent of the braking mechanism of the automobile in the event of the failure of the motive power, the brakes, or the failure of the operator to make use of them in stopping the backward movement of the vehicle.

In this specification and the annexed drawings, the invention is illustrated in the form considered to be the best, but it is to be understood that the invention is not limited to such form, because it may be embodied in other forms, and it is also to be understood that in and by the claims following the description it is desired to cover the invention in whatever form it may be embodied.

This present invention relates particularly to means for operating a reverse stop mechanism such as covered by Letters Patent, No. 1,237,169, issued August 14, 1917, to me, wherein the stop ratchets are located in the wheel assemblies of the vehicle, while in the present instance the stop mechanism is located on the propeller shaft mechanism geared to the driving wheels.

In the accompanying one sheet of drawings:

Figure 1 is a plan view of a reverse stop mechanism constructed and applied, in accordance with this invention, to the driving gear of an automobile as diagrammatically illustrated.

Fig. 2 is a side elevation of the same.

Fig. 3 is an end view from the rear of the stop mechanism partially in cross section taken on the line III—III, Fig. 1.

Figs. 4, 5 and 6 are diagrammatic views, partly in cross section viewed from above illustrating the progressive operation of the stop mechanism.

In detail the construction illustrated in the drawings includes the propeller shaft 1 of the vehicle, mounted in a suitable bearing contained in the neck 2 of the differential case 3 wherein the motive power is transmitted from the propeller shaft to the drive axis, thence to the wheels. The yokes 4—4 have the split collars 5—5 encircling the neck 2 of the differential case to which they are fixedly clamped by the bolts 6—6.

The locking device includes a circular locking plate 10 fixed on the shaft 1 with the key 11 or in any other suitable manner. The circular base plate 12 is stationary and fixed to the yokes 4—4. The inclosing oil-tight casing 13 is flanged and fixed to the base plate 12 to inclose the revolving mechanism to exclude dirt and retain oil. This inclosing casing is provided with a gland 14 surrounding the shaft 1 and forming an oil tight stuffing box therewith to prevent the escape of oil at this point. Arranged between the base plate 12 and the locking plate 10 is a circular control plate 16 rotatably mounted on a reduced portion 15 of the base plate. The control plate 16 is frictionally held in engagement with the locking plate 10 through the action of suitable resilient members 12' interposed between the control plate and the base plate 12 as shown in Figs. 3 and 4. The control plate may, however, be forcibly moved relatively to the said locking plate.

At quadrantially arranged points, or oftener, the base plate 12 is provided on its inner face with recesses 17 in which the locking dogs 18 are pivoted. These dogs are provided in the recesses at analogous ends and are under the tension of springs 19 which operate to force the free ends of the dogs, which are preferably beveled as shown in Fig. 4, outwardly beyond the inner face of the base plate. The control plate 16 is provided with the openings 21 extending therethrough, which openings correspond in position, number and arrangement with the recesses 17 in the base plate. The locking plate 10 also is provided on its inner face with recesses 22 into which the outer ends of the locking dogs 18 project, as indicated in Fig. 6, when these recesses 22, openings 21, and recesses 17 are in registration. The control plate at a point adjacent its periphery, is provided with at least one pin 23 which projects into one of the arcuate slots 24 through the body of the base plate 12 in Figs. 3 and 6. This pin and slot arrangement limits the oscillatory movement of the control plate 16 relatively to the plate 12.

The automatic operation of the device may be briefly described as follows: The automobile having come to a stop from a forward movement, the position of the parts of the device will be that indicated in Fig. 4. Now, should the brake accidentally become released, or should the machine start backward from any cause, the locking plate 10 in turning rearwardly to the left, will carry with it the control plate 16, by reason of the frictional engagement between these plates, and this movement will continue until the pin 23 on the control plate will have reached the terminal of the slot 24, Fig. 5. At this point the openings 21 of the control plate 16 will have alined with the recesses 17, and the dogs 18 will have moved outwardly under the action of their springs into engagement with the inner surface of the locking plate 10. The parts will then be in the position indicated in Fig. 5. A further rearward rotation of the rear wheel carrying with it the locking plate 10 will bring the recesses 22 into alinement with the openings 17 and 21 (see Fig. 6) and will allow the dogs 18 to engage in the recesses 22 and thus effectually arrest any further rearward movement of the wheel. When the vehicle starts forward under the impulse of the motor, the control plate 16, through the action of the frictional engagement with the locking plate 10 will move forwardly until the pin 23 reaches the forward end of the slot 24. This action of the plate will serve to withdraw the dogs 18 from the recesses 22 in the locking plate, and the solid portions of the control plate 16 will have moved substantially over the recesses 17 and, hence, the dog 18 will be retained out of the recesses 22 of the plate 10, and this will allow rotation of the locking plate as the vehicle travels forwardly without the continual running over of the dogs 18; thus the device will be noiseless. The dogs will thus be held by the control plate within the recesses 17 until the control plate is again moved rearwardly to bring the openings 21 into alinement with the openings 17.

In order that the control plate may be operated from the driver's seat, to control unrestricted rearward motion of the vehicle when the same is desired, I have provided an arrangement which operates automatically when the gear shift lever is thrown into the reverse position, to hold the control plate in such position, Fig. 4, that the locking dogs 18 will remain out of engagement with the locking plate. This control mechanism includes the gear shift lever 25 (see Fig. 2) pivoted at 26. This lever forms part of what is known in the art as selective gear transmissions, in which the lever 25 is movable laterally as well as pivotally, and in others oscillates on a ball and socket joint and swings in a circle to make the various gear selections in the transmission. They have a common result in that the end 27 of the lever in some manner eventually engages during the selection the reverse control rod 28 at the will of the operator. The shift lever 25 is shown (in Figs. 1, 2 and 3) in neutral position, with the various locking mechanisms in their correlative positions indicated in Fig. 4 as when the vehicle is being driven forward.

The extension stud 29 is fixed in the end of the reverse gear rod 28 and provided with a loop end 30, with a slot therein engaging the stud 31 in the lever 32, which is fixed on the pivot rod 33, pivoted in the brackets 34 fixed to the cross brace 35 forming part of the main frame of the automobile. On the end of the rod 33 is the lever 32' which is pivoted at 36 to the connecting link 37, the opposite end of which is pivoted at 38 to the cam plate 39 including a narrow portion 44 and a broad portion 46. This cam plate is slidable longitudinally in the guides 40—40 fixed on the plate 41 which in turn is fixed to one of the yokes 4. The shift bar 42 is provided in its outer end with a slot slidably fitting the cam plate 39. This bar is slidable in the strap guides 43—43 fixed to the plate 12, and its opposite end is provided with a slot 45 surrounding the pin 23 and of a size to accommodate and permit the unrestricted arcuate action of the pin in its movement.

Then the present status of the various parts, illustrated in the drawings, Figs. 1, 2 and 3, are actuated by operating the gear shift lever 25 into reverse position, as indicated by the arrow marked R in Fig. 2, this operation advances the lever 32', which in turn advances the plate 39 through the slot in the bar 42 shifting the latter in the direction of the arrows x (Figs. 1, 3, and 4) to move the left hand end of the slot 45 into engagement with the pin 23 (and for moving the pin, if necessary, from the position shown in Figs. 5 and 6) for maintaining the parts in the relation illustrated in Fig. 4. So long as the shift lever 25 is inclined backward in the reverse position, the vehicle is permitted to be backed under its own power without interference from the locking mechanism. If with the lever 25 vertical or in the neutral position shown in Fig. 2, it is desired to move the vehicle forward under its own power, this lever 25 is pushed forward to engage the first speed of the gear train, or any of the other selective ratios of the transmission mechanism. During the movement of the lever 25 in a direction opposite to the arrow R, Fig. 2, from the reverse position to neutral position, the forward end of the loop 30 engages the pin 31 shifting the lever 32' rearwardly in a direction opposite to the arrow y, whereby the cam plate 39 is moved through the slot in the bar 42 to assume the position shown in Fig. 1 with the narrow portion 44 of the cam plate extending in the slot of the bar 42. A tension spring 47 has one end secured to the end 46 of the bar 42 and its opposite end fixed to a stationary part of the device, such as at 47ª, and is arranged so as to normally urge the bar 42 in a direction opposite to the arrow x, in Figs. 1 and 4. Therefore, with the cam plate 39 in position shown in Fig. 1 the bar 42 assumes the position clearly shown in Fig. 3 and in full lines of Fig. 4. This releases the pin 23 from control of the plate 42; and therefore, with the various parts in this normal relation, any accidental backward movement of the plate 12 incidental to the backing of the vehicle would cause it to frictionally back up the plate 16, throwing the parts into the relation indicated in Fig. 6, and stopping further backward movement of the vehicle. Except when locked in the reverse position, as indicated in dotted lines of Fig. 4, the plate 16 is under frictional control of and moves with the plate 10 and is, therefore, set at all times to lock the backward movement of the car when the gear shift lever is in any of the several "forward" speeds and is, therefore, wholly automatic in its operation, being manually controlled only in the "reverse" selection and being then automatic in its action of being thrown out of operation.

The portions 44 are sufficiently long so that the lost motion between the chassis and the body of the vehicle can be taken up by the movement of the cam plate within the slot in the bar 42 without altering the correlation of the parts of the lock. From the normal position of the cam plate, the bar 42 moves laterally in the direction of the arrows x as it rides up the incline of 39 of the cam plate in assuming the relations shown in dotted lines of Fig. 4.

Having thus described my invention, what I claim and desire to secure by Letters Patent is:

1. A reverse stop for vehicles including a fixed member, a movable member, stop members interposed between said members; and control means controlling said stop members including a slidable bar; a cam plate engaging said bar and means for actuating said cam plate.

2. A reverse stop for vehicles including a fixed member, a movable member, stop members interposed between said members; and contact means controlling said stop members and including a slidable bar; a cam plate engaging said bar; a pivoted lever linked to said cam plate; and loop means engaging said lever with a prescribed lost motion.

3. In combination with a motor vehicle, a fixed base member, a locking member fixed upon a rotating shaft of the transmission of said vehicle; stop members interposed between said members; and control means controlling said stop members including a bar slidable on said base member and engaging said locking members with a predetermined lost motion; and means for actuating said bar synchronously with the movement of the reverse gear control of said vehicle transmission.

4. In combination with a motor vehicle, a fixed base member, a locking member fixed upon a rotating shaft of the transmission of said vehicle; stop members interposed between said members; and control means controlling said stop members including a bar slidable on said base member and engaging said locking members with a predetermined lost motion; a cam plate slidably engaging said bar; a pivoted lever linked to said cam plate; and loop means engaging said lever with a prescribed lost motion.

5. In combination with a motor vehicle, a movable member fixed on the propeller shaft of said vehicle; a base member fixed to an immovable part of said vehicle adjacent to said movable member; locking members interposed between said locking and base members; and means for manually operating said locking members to arrest backward movement of said vehicle.

6. In combination with a motor vehicle, a locking member fixed on the propeller shaft of said vehicle; a base member fixed to an immovable part of said vehicle adjacent to said locking member; dogs pivoted in one of said members adapted to engage in recesses in the opposite said member; a control plate interposed between said members having recesses therein adapted to register with said dogs; means for automatically moving said recesses into registry with said dogs when said vehicle moves backward; and means for locking said recesses out of said registry when the reverse gear of said vehicle is in operation.

7. In combination with a motor vehicle a locking member fixed on the propeller shaft of said vehicle; a base member fixed to an immovable part of said vehicle adjacent to said locking member; dogs pivoted in one of said members adapted to engage recesses in the opposite said member; a control plate interposed between said members having recesses therein adapted to register with said dogs; a cam plate slidably guided on said immovable part of said vehicle; a bar having a sliding engagement with said cam plate and engaging said control plate with a predetermined lost motion; and means for moving said cam plate synchronously with the shifting of the reverse gear of said vehicle transmission.

8. In combination with a motor vehicle, a locking member fixed on the propeller shaft of said vehicle, a base member fixed to an immovable part of said vehicle adjacent to said locking member; dogs pivoted in one of said members adapted to engage recesses in the opposite said member; a control plate interposed between said members having recesses therein adapted to register with said dogs; a cam plate slidably guided on said immovable part of said vehicle; a bar having a sliding engagement with said cam plate and engaging said control plate with a predetermined lost motion; a lever pivoted on the frame of said vehicle; a link between said lever and said cam plate; and a connection with a predetermined lost motion with the reverse gear shift of said vehicle transmission.

9. In combination with a motor vehicle, a locking member fixed on the propeller shaft of said vehicle; a base member fixed to an immovable part of said vehicle adjacent to said locking member; dogs pivoted in one of said members adapted to engage recesses in the opposite said member; a control plate interposed between said members having recesses therein adapted to register with said dogs; and a pin on the control plate protruding through a slot in said base member; a cam plate slidably guided on said immovable part of said vehicle; a bar having a sliding engagement with said cam plate and a slot engaging said pin; and means for moving said cam plate synchronously with the shifting of the reverse gear of said vehicle transmission.

10. In combination with a motor vehicle, a locking member fixed to the propeller shaft of said vehicle, a base member fixed to an immovable part of said vehicle adjacent to said locking member; dogs pivoted in one of said members adapted to engage recesses in the opposite said member; a control plate interposed between said members having recesses therein adapted to register with said dogs, and a pin thereon protruding through a slot in said base member; a cam plate slidably guided on said immovable part of said vehicle; a bar having a sliding engagement with said cam plate and a slot in which said pin engages; a lever pivoted on the frame of said vehicle; a link between said lever and said cam plate; and a connection with a predetermined lost motion with the reverse gear shift of said vehicle transmission.

In testimony whereof, I have hereunto set my hand at San Francisco, California, this 13th day of March, 1918.

CHARLES P. CIRAC.

In presence of—
BALDWIN VALE,
A. J. HENRY.